(12) United States Patent
Bailey

(10) Patent No.: US 6,287,719 B1
(45) Date of Patent: Sep. 11, 2001

(54) BATTERY INCLUDING A NON-AQUEOUS MULTI-CELL SPIRAL-WOUND ELECTRODE ASSEMBLY

(75) Inventor: John C. Bailey, Columbia Station, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/094,820

(22) Filed: Jun. 15, 1998

(51) Int. Cl.[7] .................................................. H01M 10/04
(52) U.S. Cl. ............................ 429/94; 429/99; 429/164; 429/159
(58) Field of Search ............................. 429/94, 99, 164, 429/159, 120; 29/623

(56) References Cited

U.S. PATENT DOCUMENTS

| | | | |
|---|---|---|---|
| 2,661,388 | 12/1953 | Warner | 136/100 |
| 4,051,304 | 9/1977 | Snook | 429/94 |
| 4,709,472 | * 12/1987 | Machida et al. | 29/623 |
| 4,929,519 | * 5/1990 | Catotti | 429/94 |
| 4,963,445 | * 10/1990 | Marple et al. | 429/94 |
| 5,034,290 | * 7/1991 | Sands et al. | 429/120 |
| 5,219,573 | 6/1993 | Kaun | 429/32 |
| 5,288,564 | 2/1994 | Klein | 429/94 |
| 5,300,373 | 4/1994 | Shackle | 429/152 |
| 5,498,489 | 3/1996 | Dasgupta | 429/152 |
| 5,503,948 | 4/1996 | MacKay | 429/152 |
| 5,547,780 | 8/1996 | Kagawa | 429/149 |
| 5,578,392 | * 11/1996 | Kawamura | 429/99 |
| 5,582,931 | 12/1996 | Kawakami | 429/127 |
| 5,633,097 | 5/1997 | Miller | 429/94 |
| 5,637,416 | * 6/1997 | Yoshii et al. | 429/94 |
| 5,693,105 | 12/1997 | Kawakami | 29/623.2 |
| 5,849,431 | * 12/1998 | Kita et al. | 429/164 |
| 5,856,037 | * 1/1999 | Casale et al. | 429/82 |

FOREIGN PATENT DOCUMENTS

| | | | |
|---|---|---|---|
| 0 533 576 A | 3/1993 | (EP) | H01M/4/82 |
| 0 602 976 A | 6/1994 | (EP) | H01M/6/40 |
| HEI 5-54895 | 3/1993 | (JP) . | |
| WO 95/31836 A | 11/1995 | (WO) | H01M/6/46 |

OTHER PUBLICATIONS

Vinal, George Wood, "Dry Cells—Material Production," *Primary Batteries*, John Wiley & Sons, Inc., pp. 53–56.

Vincent, Colin A., "Primary Aqueous Electrolyte Cells," *Modern Batteries*, Edward Arnold (Publishers) Ltd. pp. 68–75.

* cited by examiner

Primary Examiner—Gabrielle Brouillette
Assistant Examiner—M. Wills
(74) Attorney, Agent, or Firm—Russell H. Toye, Jr.; Robert W. Welsh

(57) ABSTRACT

A battery construction is disclosed that includes a housing and a spiral-wound electrode assembly disposed in the housing and defining at least two electrochemical cells that are electrically connected in series. Both of the cells include wound layers of a positive electrode, a negative electrode, and a polymer electrolyte provided between the positive and negative electrode layers. The layers of each successive electrochemical cell are wound around the layers of the previous cell and are preferably separated therefrom by an insulating layer. By utilizing a polymer electrolyte, the need for expensive microporous separator layers is eliminated as is the need for providing separate sealed containers to construct a multi-cell battery. Thus, a less-expensive and space-efficient multi-cell spiral-wound electrode construction may be obtained.

24 Claims, 6 Drawing Sheets

BATTERY INCLUDING A NON-AQUEOUS MULTI-CELL SPIRAL-WOUND ELECTRODE ASSEMBLY

BACKGROUND OF THE INVENTION

The present invention generally relates to batteries having one or more electrochemical cells. The present invention further generally relates to batteries including an electrochemical cell having a spiral-wound electrode assembly in which the positive and negative electrodes of the electrochemical cell are wound about a mandrel in a spiral manner.

Batteries are known that include an electrochemical cell in which the positive and negative electrodes are wound into a spiral-wound electrode assembly (also known as a jelly roll assembly). The positive and negative electrodes in these types of batteries are typically constructed of elongated conductive foil strips made of aluminum or copper that have a mixture of materials including active electrochemical materials coated on both sides. The positive and negative electrodes are wound by a mandrel with layers of a separator material disposed between the electrode layers so as to prevent any physical contact between the positive and negative electrodes. After the spiral-wound electrode assembly has been wound about the mandrel, the spiral-wound electrode assembly is removed and inserted into an open end of a cylindrical or prismatic metal cell housing. Subsequently, an electrolyte is dispensed into the open end of the cell housing. The liquid electrolyte flows around and within the spiral-wound electrode assembly and is absorbed into the separator layers between the positive and negative electrodes so as to enable the transport of ions between the positive and negative electrodes.

After the electrolyte has been dispensed within the cell housing, the cell housing is sealed by inserting a cover assembly into the open end such that the cover assembly is electrically connected to one of the electrodes, and crimping the cell housing to hold the cover assembly in place. The cover assembly is also preferably electrically insulated from the cell housing so that the cover assembly and the cell housing each serve as electrical contact terminals having opposite polarities.

Such spiral-wound electrode-type cells are typically used in combination in rechargeable battery packs for video cameras, cellular telephones, and portable computers. Because battery packs of these types require high output voltages, the cells used typically have cell voltages at or in excess of 3 volts. The components used to construct these electrochemical cells are typically more expensive and require more stable electrolytes and binders, which bind the active electrochemical materials to the conductive electrode strips.

A further problem with the construction of spiral-wound electrode-type electrochemical cells constructed as described above, results from the use of the microporous separators. Such microporous separators are one of the more expensive components of the electrochemical cell. Further, these separators typically increase the internal resistance of the cell and, as a consequence, may decrease the high-rate performance of the cell. Moreover, the separators themselves are not electrochemically active components and consume space within the cell housing that could otherwise be filled with electrochemically active components.

It is known in the art of alkaline batteries to construct a high-voltage battery using a plurality of lower voltage electrochemical cells coupled in series. For example, conventional 9-volt batteries are constructed by coupling six 1.5-volt cells in series. Such multi-cell batteries are typically constructed using electrochemical cells that have separate sealed housings so as to keep the liquid electrolyte contained therein separate from each of the other cells. If the liquid electrolyte were allowed to flow freely between the cells, inter-cell leakage current would result. Because of the space that would be required within the battery housing for including separate sealed cells, such batteries make poor use of the total battery volume. As a result, low-voltage cells are poor candidates for high-voltage battery construction.

SUMMARY OF THE INVENTION

Accordingly, it is an aspect of the present invention to solve the above problems by providing a battery having a multi-cell, spiral-wound electrode-type construction that does not require separate sealed containers for each of the cells. An additional aspect of the present invention is to provide a battery having a spiral-wound electrode-type construction that does not require the use of expensive separators. It is yet another aspect of the present invention to provide a battery that is capable of generating cell voltages of 3 or more volts while enabling the use of less-expensive lower voltage components. A further aspect of the present invention is to provide a multi-cell construction that is relatively easy to manufacture using conventional electrode winding equipment.

To achieve these and other aspects and advantages, a battery constructed in accordance with the present invention comprises a housing and a spiral-wound electrode assembly disposed in the housing and defining at least two concentric electrochemical cells that are electrically connected in series. Each of the cells includes wound layers of a positive electrode, a negative electrode, and a polymer electrolyte provided between the positive and negative electrode layers. Preferably, the cells are electrically insulated from one another by providing an insulating layer that is wound between electrode layers of the cells that are otherwise adjacent to one another.

By utilizing a polymer electrolyte, the electrolyte cannot flow between the cells and thereby create an inter-cell leakage current. Thus, the need for separate sealed containers is eliminated. By eliminating the need for sealed containers within the battery housing, the electrochemical cells may be disposed in the battery housing in the most space-efficient manner. Also, by utilizing a polymer electrolyte, the need for microporous separator layers is eliminated since the polymer electrolyte prevents physical contact between the positive and negative electrode layers. The term "polymer electrolyte" as used herein means a material which has ionic conductivity but is substantially physically immobile and hence remains positioned between the anode and cathode. The composition of such polymer electrolytes can range from a salt dissolved in a high molecular weight polymer with no low molecular weight plasticizer to compositions containing electrolyte salt, a large amount of one or more low molecular weight solvents, and only sufficient polymer to immobilize (gel) the low molecular weight solvent.

In addition, by enabling the creation of a multi-cell, spiral-wound electrode assembly, higher voltage batteries may be constructed that utilize lower voltage cells that in turn may utilize less-expensive lower voltage components.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
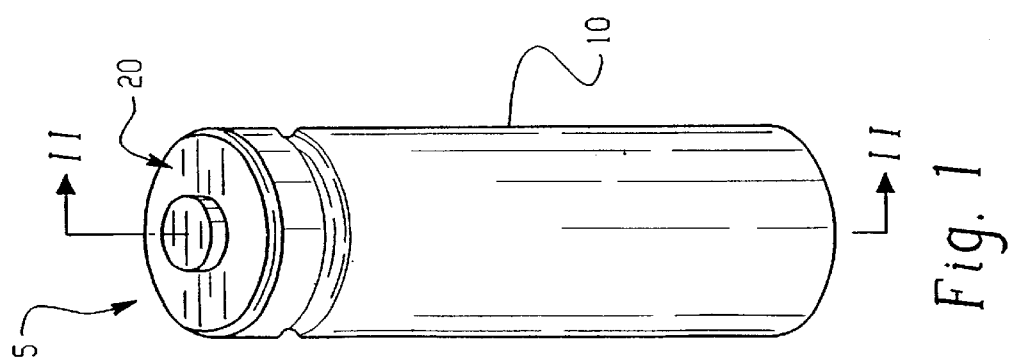
FIG. 1 is a perspective view of a battery constructed in accordance with the present invention.
Figure 2:
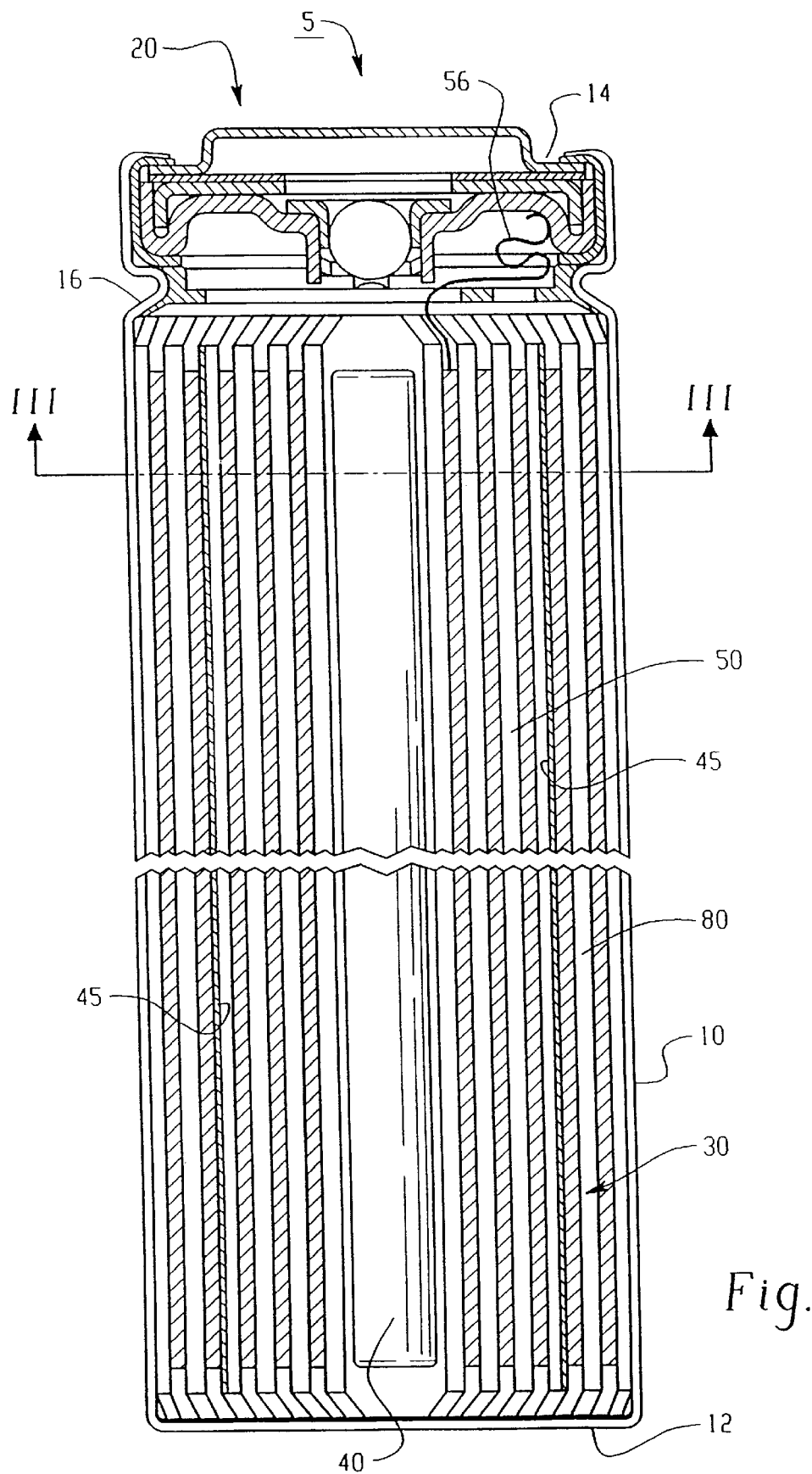
FIG. 2 is a cross section of the battery shown in FIG. 1 taken along the plane II—II.

A battery 5 constructed in accordance with the present invention is shown in FIGS. 1 and 2. As shown, battery 5 includes a housing 10 having a closed end 12 and an open end 14. Housing 10 is preferably constructed of a structurally rigid material that is chemically inert and electrically conductive. Housing 10 may be cylindrical or prismatic. As will be described in more detail below, battery 5 includes a spiral-wound electrode assembly 30 disposed within housing 10 and having at least a first electrochemical cell 50 and a second electrochemical cell 80 separated by an insulator layer 45. As also described further below, first and second cells 50 and 80 are constructed of wound layers of a positive electrode, a negative electrode, and a polymer electrolyte disposed between the alternating layers of positive and negative electrodes. After spiral-wound electrode assembly 30 has been wound and deposited within the open end 14 of housing 10, a core pin 40 may optionally be inserted into the middle of spiral-wound electrode assembly 30 so as to decrease the likelihood of an internal short circuit in the event housing 10 is crushed.

As used herein, the term "electrochemical cell" or simply "cell" shall refer to the basic functional unit providing a source of electrical energy by direct conversion of chemical energy which includes an assembly of electrodes and electrolyte/separator. As described in more detail below, each "cell" of the multi-cell construction does not include its own container. As also used herein, the term "battery" shall refer to an assembly of cells disposed in a battery housing that provides two external contact terminals.

Housing 10 may then have a circumferential bead 16 formed proximate open end 14. Bead 16 is formed to provide a ledge upon which a cover assembly 20 may rest when inserted into open end 14. Once inserted, cover assembly 20 may be crimped in place using any conventional technique.

Figure 3:
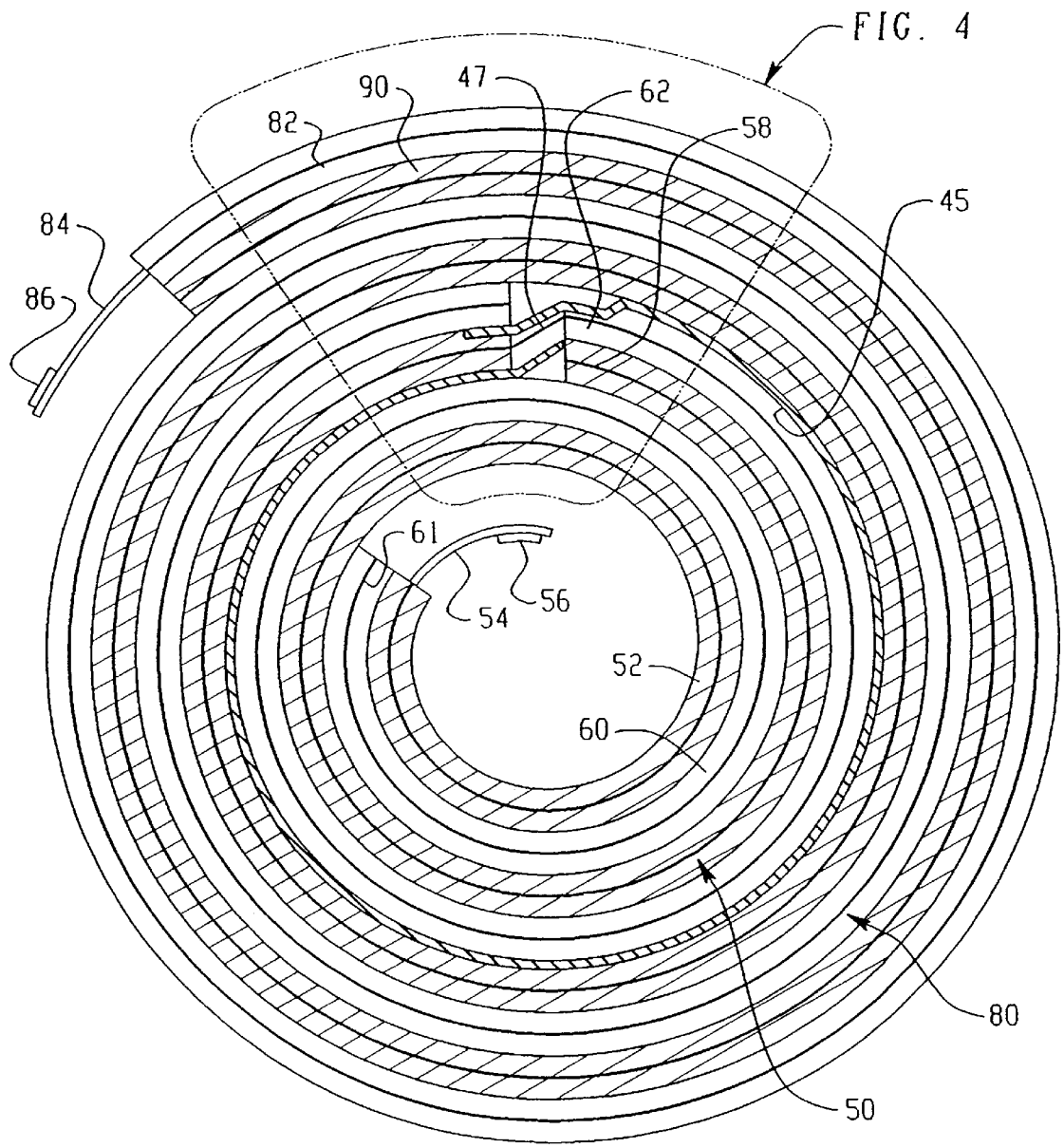
FIG. 3 is a simplified cross-sectional view of a spiral-wound electrode assembly constructed in accordance with the present invention as it would appear if taken along plane III—III of the battery shown in FIG. 2.

As shown in FIG. 3, spiral-wound electrode assembly 30 includes a first cell 50 that is formed by winding a positive electrode 52 and a negative electrode 60 about a mandrel to form alternating layers of the positive and negative electrodes that spiral outward. After first cell 50 has been wound, an electrical insulating layer 45 is wound about the outer layers of first cell 50. Subsequently, second cell 80, which includes alternating layers of a positive electrode 90 and a negative electrode 82, are wound about the mandrel over insulating layer 45.

Figure 4:
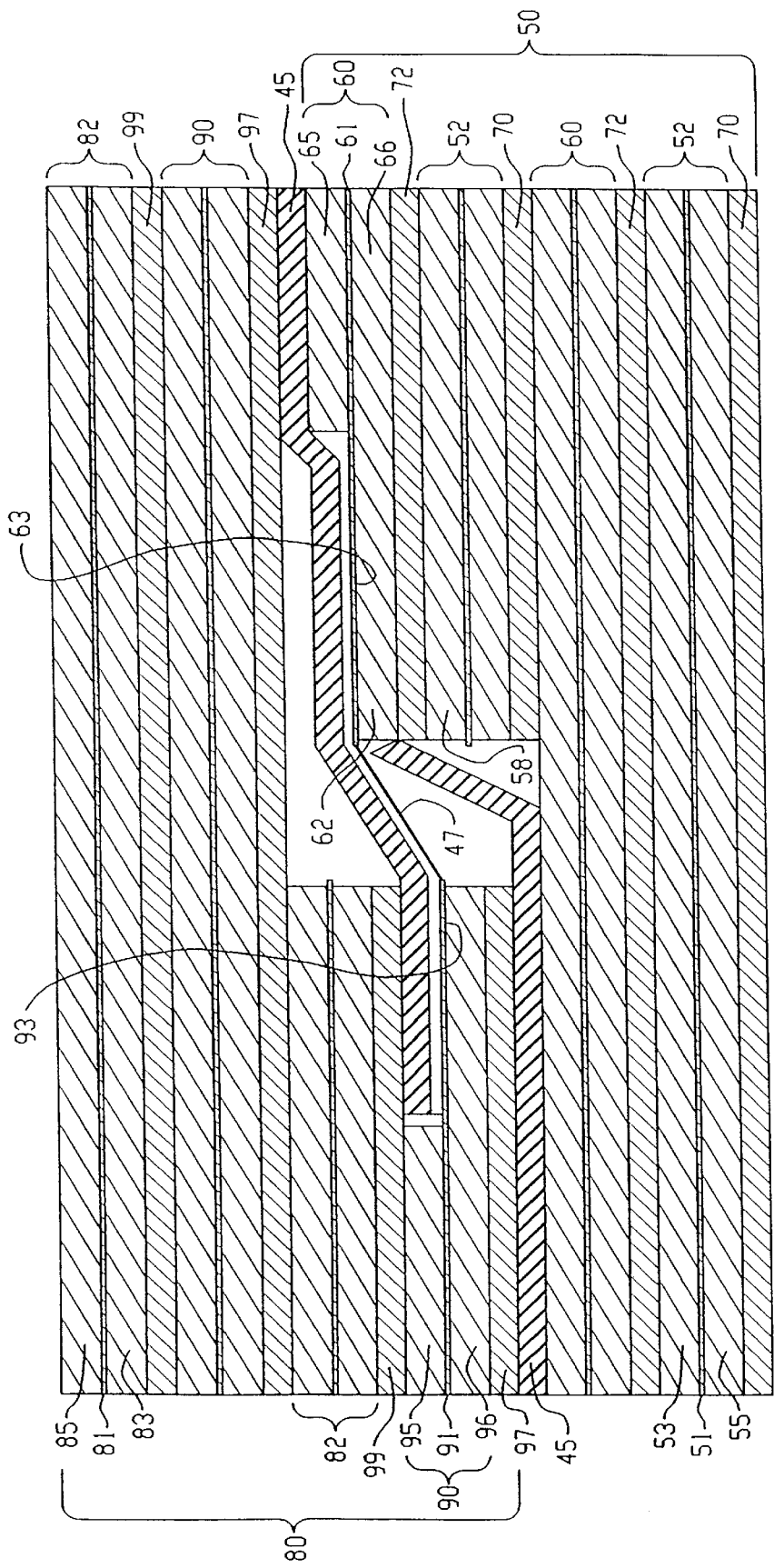
FIG. 4 is an enlarged cross-sectional view of the portion of the spiral-wound electrode assembly identified as FIG. 4 in the cross section shown in FIG. 3.

As illustrated in FIG. 4, first negative electrode layer 60 includes a conductive foil strip 61 having a mixture coated on one or more of its sides 65 and 66, and second negative electrode 82 includes a conductive foil strip 81 having a mixture coated on one or more of its sides 83 and 85. The mixture coated on conductive foils 61 and 81 may include any electrochemically active material conventionally used on similar types of negative electrodes as well as any conventional binder and conductive agent used with such active materials. Positive electrodes 52 and 90 also each include an elongated strip of a conductive foil 51 and 91 that has a mixture coated on one or more of its sides 53 and 55, and 95 and 96, respectively. The mixture coated on conductive foils 51 and 91 may include any electrochemically active materials conventionally used on similar types of positive electrodes as well as any suitable conventional binder and conductive agent. Preferred coatings for the positive and negative electrodes are described in further detail below following the remainder of the description of the physical construction of the battery of the present invention.

Figure 5:
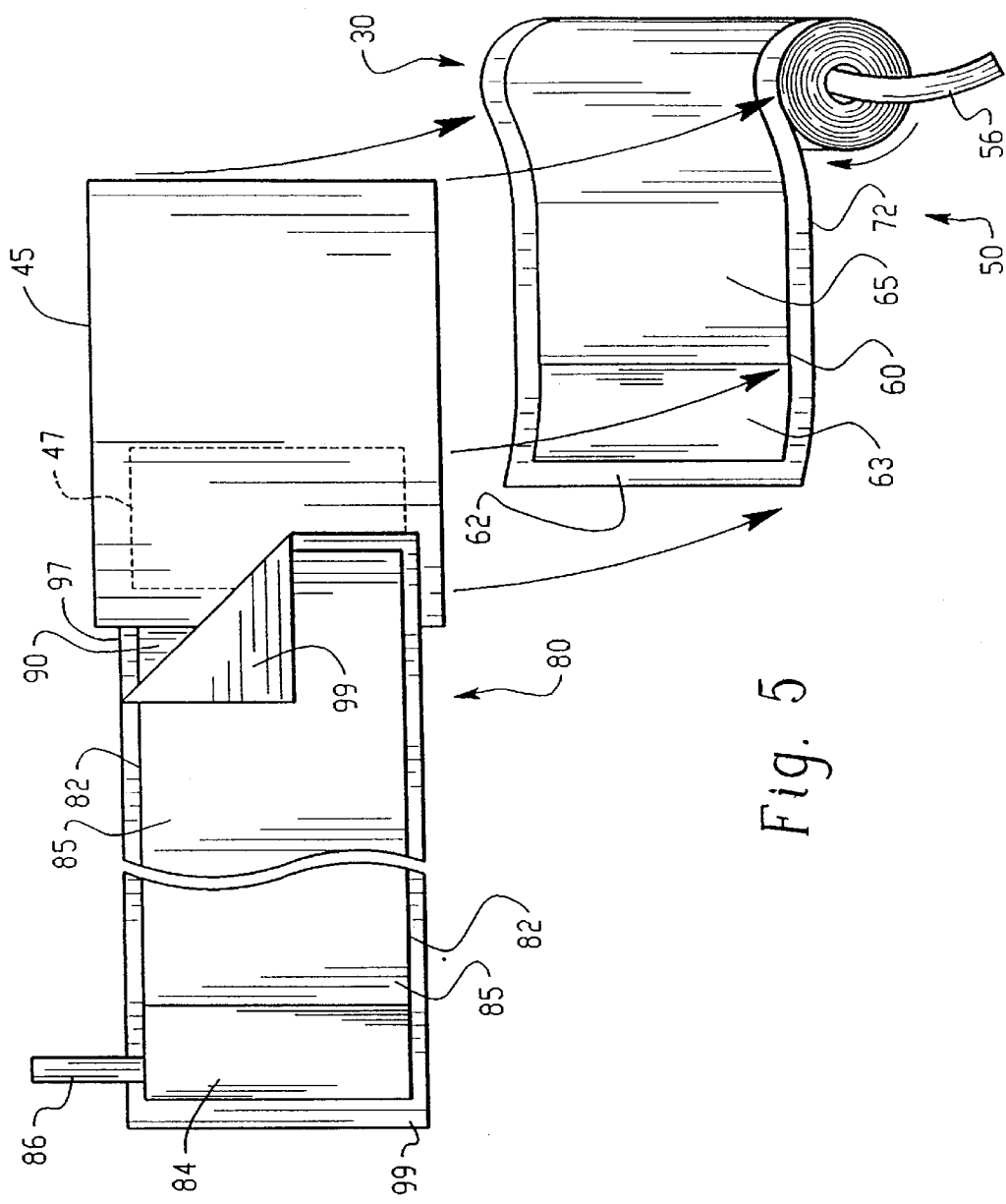
FIG. 5 is a partially-exploded perspective view of a spiral-wound electrode assembly constructed in accordance with the present invention.
Figure 6:
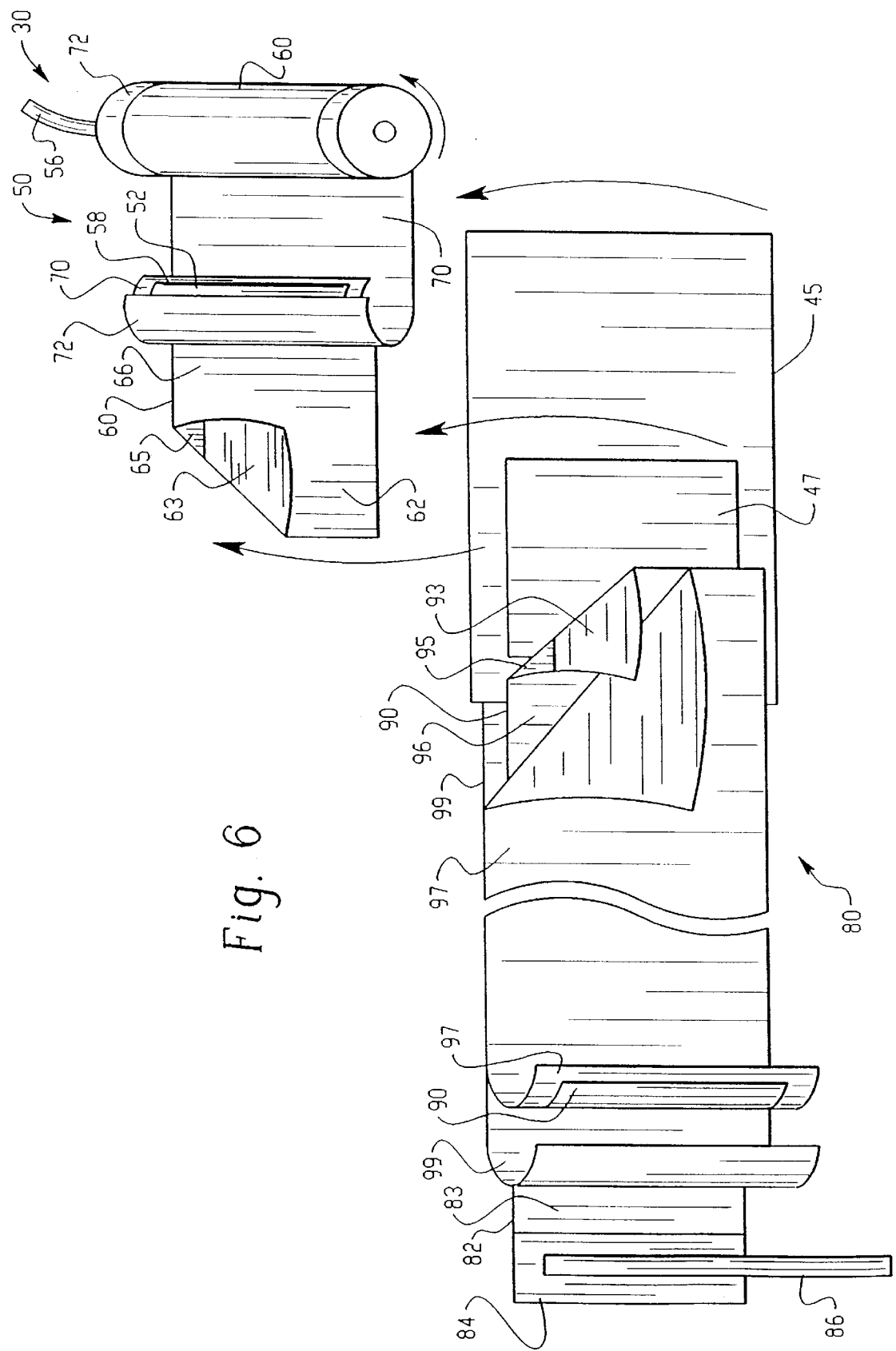
FIG. 6 is a partially-exploded perspective view of a spiral-wound electrode assembly constructed in accordance with the present invention as viewed from a side opposite that shown in FIG. 5.

As shown in FIG. 3, a leading end 54 of the metal foil of positive electrode 52 is left uncoated and exposed such that a conductive tab 56 may be welded thereto which, as shown in FIGS. 5 and 6, extends from one end of spiral-wound electrode assembly 30. Conductive tab 56 is preferably configured so as to be electrically coupled to an exterior contact terminal of cover assembly 20. Similarly, a trailing end 84 of the conductive foil of negative electrode 82 is also left exposed such that a second conductive tab 86 may be welded thereto. As shown in FIGS. 5 and 6, second conductive tab 86 extends from an opposite end of spiral-wound electrode assembly 30 so as to be electrically connected to closed end 12 of housing 10. In this manner, contact terminals may be provided at opposite ends of battery 5 that are connected to electrodes of opposite polarity within housing 10. Further, by providing an electrical connector strip 47 to electrically couple the exposed conductive foil 63 of negative electrode 60 of first cell 50 to the exposed conductive foil 93 of positive electrode 90 of second cell 80, first and second cells 50 and 80 may be electrically coupled in series. In this manner, with the negative electrode 82 of second cell 80 coupled to a negative contact terminal of battery 5 through conductive tab 86 and housing 10, and positive electrode 90 coupled to a positive external contact terminal of battery 5 through conductive tab 56 and cover assembly 20, the voltage appearing between the exterior positive and negative terminals of battery 5 will be equal to the sum of the cell voltages of first cell 50 and second cell 80.

For purposes of simplification, the layers of polymer electrolyte material that are disposed between the negative and positive electrodes of cells 50 and 80 are not shown in FIG. 3. However, as best shown in FIG. 6, first cell 50 is constructed using first and second layers of polymer electrolyte 70 and 72 that are provided in the form of elongated strips that are wound about the mandrel along with positive and negative electrodes 52 and 60. Electrolyte layers 70 and 72 are preferably slightly wider than positive and negative electrodes 52 and 60 so as to prevent any inadvertent contact therebetween in the event there is any misalignment of the layers during the winding process. As shown in FIGS. 4–6, positive electrode 52 is preferably coated with the active material mixture over its entire length with the exception of leading end 54 (FIG. 3). Negative electrode 60 is preferably coated with the active material mixture over its entire length on both sides with the exception of one side of its trailing end 62. This exposed conductive foil 63 is provided to enable electrical contact with electrical connector strip 47. In a similar manner, positive electrode 90 includes an exposed foil portion 93 on a leading end thereof for contacting connector strip 47. In this manner, the conductive foil of negative electrode 60 of first cell 50 may be electrically connected to the conductive foil of positive electrode 90 of second cell 80. Although the use of a separate connector strip 47 is disclosed, it will be appreciated by those skilled in the art that the conductive foils of the electrodes may be provided in direct contact without using a separate element to make the series connection.

As shown in FIGS. 4–6, connector strip 47 may be formed on or adhered to a portion of electrical insulating layer 45. As shown in FIGS. 4–6, insulating layer 45 having connector strip 47 assembled thereon may be inserted between positive electrode layer 90 and a polymer electrolyte layer 99 so that connector strip 47 contacts exposed region 93 of the foil of positive electrode 90. With a portion of connector strip 47 extending out beyond the leading edges of positive electrode 90 and a second polymer electrolyte layer 97, insulating layer 45 may be applied over negative electrode 60 of first cell 50 with the portion of connector strip 47 extending beyond the leading edges of the layers of second cell 80 being aligned with exposed foil region 63 of negative electrode 60. Preferably, insulating layer 45 is slightly longer than the circumference of first cell 50. In this manner, insulating layer 45 will be completely wound about the outermost layers of first cell 50 prior to the winding of any of the layers of second cell 80.

It will be appreciated by those skilled in the art that first cell 50 may be wound about the mandrel prior to applying insulating layer 45 or any of the layers of second cell 80. Alternatively, insulating layer 45 may be attached to the trailing end of the layers of first cell 50 and to the leading end of second cell 80 prior to winding such that the winding process need not be halted until the complete spiral-wound electrode assembly has been wound.

Although only two cells have been disclosed for the construction of spiral-wound electrode assembly 30, it will be appreciated by those skilled in the art that additional cells could be included by connecting the negative or positive electrodes of one cell with the positive or negative electrodes of a subsequent cell in the same manner as described above. It will further be appreciated that the arrangement of the layers within the spiral-wound electrode may also be varied so long as electrolyte layers are wound between each of the positive and negative electrode layers. Further, the manner by which the cells are insulated from one another within the spiral-wound electrode assembly and the manner by which the cells are electrically coupled in series may vary from the specific example illustrated above without departing from the spirit and scope of the present invention.

As noted above, the use of polymer electrolytes is attractive because such solid or semi-solid electrolytes can eliminate the need for a microporous separator and provide a final product which is free from liquid electrolyte. Thus, by eliminating the microporous separators, the overall cost of the battery may be reduced. Further, the increase in internal resistance of the cell caused by such separators may also be reduced and, as a consequence, so may the resultant decrease in the high-rate performance of the cell.

Figure 7:
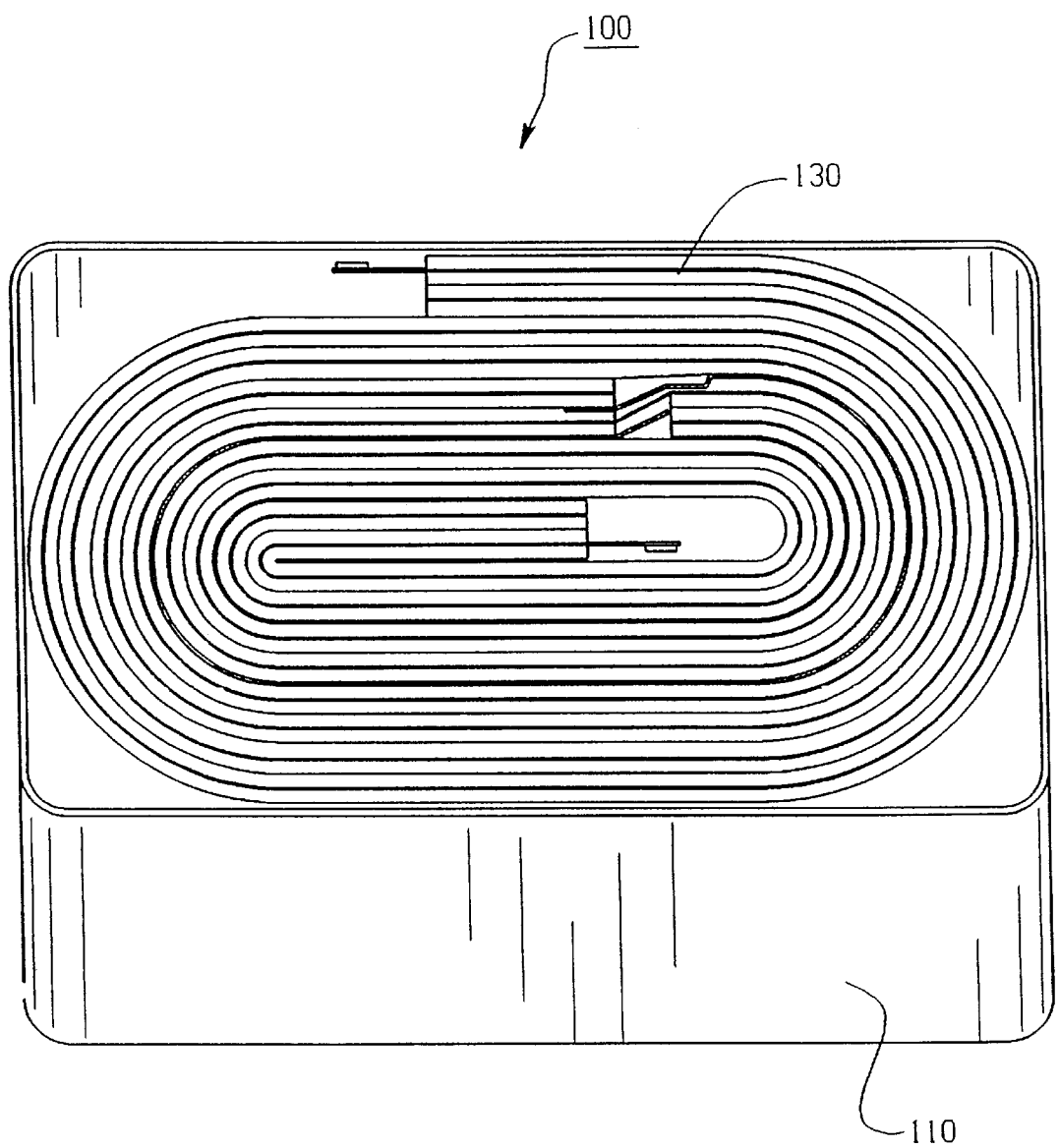
FIG. 7 is a perspective view of an unsealed prismatic battery constructed in accordance with the present invention.

Although the above battery construction has been described with respect to a cylindrical battery having a cylindrical housing and having a cylindrical spiral-wound electrode assembly disposed therein, the present invention may also be implemented in prismatic batteries or the like, such as prismatic battery 100 shown in FIG. 7. As shown in FIG. 7, prismatic battery 100 includes a battery housing 110 having a plurality of flat surfaces. The spiral-wound electrode assembly 130 may be wound about a paddle-shaped mandrel to more efficiently fit within the shape of the prismatic battery housing 110. Thus, with this construction, the spiral-wound electrode assembly would have a non-cylindrical shape.

The above multi-cell battery construction may be used to construct both primary and secondary (rechargeable) batteries utilizing any electrochemical system for which polymer electrolytes are suitable. Examples of types of electrochemical systems with which this invention may be used include alkaline manganese dioxide, nickel cadmium, nickel metal hydride and zinc air systems having aqueous electrolytes, and lithium and lithium ion types with nonaqueous electrolytes. Lithium batteries are preferred primary batteries, in which lithium and alloys thereof are preferred negative electrode active materials and $MnO_2$, $FeS_2$, $(C_2F)_n$, $(CF_2)_n$, CuS and $CuS_2$ are preferred positive electrode active materials. Lithium ion batteries are preferred secondary batteries, in which lithium-intercalable/intercalated materials are used as negative and positive electrode materials. Preferred materials for the negative electrode are carbonaceous materials such as graphite, amorphous carbon and mesophase carbon, transition metal oxides and sulfides, and amorphous metal oxides containing silicon and/or tin. Preferred materials for the positive electrode are lithiated metal oxides, especially those containing cobalt, nickel or manganese. Examples include $LiCoO_2$ and $LiMn_2O_4$. Electrolyte salts typically used for lithium and lithium ion cells include $LiPF_6$, $LiAsF_6$, $LiBF_4$, $LiClO_4$, $LiCF_3SO_3$, $Li(CF_3SO_2)_2N$ and LiI. Preferred electrolyte solvents are nonaqueous solvents in which the electrolyte salt is soluble and which also serve as a plasticizer for the polymer electrolyte separator, as disclosed below.

Electrodes for use in this invention may be made by any known method suitable for producing electrodes which may be spirally wound into an electrode assembly. Such methods include coating, laminating or impregnating a flexible, electrically conductive substrate, such as a metal foil, screen or foam, a perforated metal sheet, or an expanded metal sheet, with active electrode material. Rollcoating a slurry of active material and binder onto a thin metal foil is a preferred method of making electrodes for lithium and lithium ion cells. For both primary and rechargeable cells, the foil on which the negative electrode is formed is preferably made of copper, and the foil for the positive electrode is preferably made of aluminum. In some cell constructions, one of the negative or positive electrode may be formed without utilizing a conductive foil.

In such an event, the connector strip 47 would directly contact the active material of such an electrode.

Suitable polymer electrolyte materials are disclosed in U.S. Pat. No. 5,409,786. The preferred polymer electrolyte materials are discussed below.

There are several important considerations in the manufacture of polymer electrolyte cells. These include (1) obtaining suitable positive electrode packing, (2) providing an electrolyte/separator which has suitable ionic conductivity but is mechanically stable, and (3) avoiding the safety problems associated with assembling live high area cells without a prior continuity check for shorts.

With respect to packing positive electrodes, common methods of preparing such polymer electrolyte cell positive electrodes include casting a mixture of the positive electrode active material, electronic conductor (for example carbon black, graphite, metal powder, or similar material), and the polymer electrolyte in a volatile solvent. This mixture can be applied to a suitable metallic carrier and dried by removal of the volatile solvent.

Although a positive electrode of suitably high packing can, in principle, be prepared this way, in practice, the integrity of the positive electrode is often low due to the formation of "mud cracks" as the solvent evaporates. Further, the recovery of large volumes of toxic and/or flammable solvent may be required. A process which avoids the "mud cracking" and solvent problems is to prepare a mixture of the polymer electrolyte monomers, the electrolyte salt, the polymer plasticizers, the electric conductor, and the positive electrode active material. This mixture can be applied to a metallic carrier by extrusion or other methods capable of converting a highly viscous paste into a thin, positive electrode film. Once the paste has been applied to the carrier, it can be polymerized in place by heating using an electron beam or similar high energy radiation. However, positive electrodes produced by this method require high levels of electrolyte in order to keep the paste viscosity low enough to process. For this reason, the packing of positive electrode active material is usually limited to 40 percent by volume or lower. Packing of 55 percent or higher is desirable for a higher energy density cell.

These positive electrode problems can be avoided by the use of a modified version of a roll coating process currently used to produce the positive electrode of AA-sized $Li/FeS_2$ cells. In this process, a mixture of a polymer binder, for example, polypropylene, polyethylene-polypropylene copolymer, polyethylene oxide, etc., the positive electrode active material, an electronic conductor, and a volatile solvent (to reduce the viscosity of the mixture) is prepared. This mixture is roll coated onto aluminum foil, dried to remove the volatile solvent, then rolled to produce a smooth uniform electrode. The positive electrodes made with this process have active material volumes of 55 percent or more and are suitable for the manufacture of high energy density cells. It has been found that positive electrodes suitable for a high energy density polymer electrolyte cell can be made by preparing the above positive electrode mixture but substituting a combination of electrolyte polymers and monomers for the binder, substituting a suitable polymer electrolyte plasticizer for at least the majority of the volatile solvent, and finally, including a thermal initiator so that the monomers can be polymerized during the heating step. Suitable monomers include polyethylene glycol acrylates, diacrylates, and triacrylates which contain 8–10 polyethylene glycol units. An example of a suitable thermal polymerization initiator is 2,2'-azobisisobutyronitrile. Plasticizers which are chemically compatible with the lithium system include the solvents which are commonly used to prepare lithium and lithium ion battery liquid electrolytes. For example, any one or a combination of diglyme (diethylene glycol dimethyl ether), tetraglyme (tetraethylene glycol dimethyl ether), ethylene carbonate, dimethyl carbonate, diethyl carbonate, dimethoxyethane, methylethyl carbonate, propylene carbonate and the like may be used. The electrolyte salt may be included in the roll coating mixture, but is preferably omitted and introduced into the cell after assembly in order to prevent cell activation immediately upon combining the negative electrode, positive electrode and polymer electrolyte/separator layer.

Another important consideration in producing a polymer electrolyte cell, is applying the polymer electrolyte layer between the negative and positive electrode layers. The polymer electrolyte layer must have both sufficient ionic conductivity to enable the cell to function at high rates yet have mechanical properties so that the negative and positive electrode layers remain physically and electrically separated. Electrolytes which have high ionic conductivity often contain 50 volume percent or more plasticizer (solvent) and have the physical properties more like a gel than a plastic film. At the other extreme, polymer films with reduced plasticizer levels and good physical properties generally have ionic conductivities 2–3 orders of magnitude below that of organic liquid electrolytes and the highly-plasticized polymer electrolytes.

Polymer electrolyte cells may be made by manufacturing a positive electrode as described above and mating it to the negative electrode with a polymer electrolyte layer therebetween. The cell is then instantly activated as it is assembled. Any flaws in the components or malfunction of the cell assembling machinery may result in an electrical short. The shorted cell will heat rapidly and may catch fire.

Both the mechanical properties of the electrolyte and the safety problem associated with assembling a live cell may be avoided by omitting the majority of the electrolyte plasticizer and preferably all the electrolyte salt from the polymer electrolyte/separator layer. Without the high volume of plasticizer, the electrolyte will have properties more like a plastic film than a gel. Further, without the electrolyte salt, this film will have substantially no ionic conductivity so that a cell assembled with this film will not be live. Any cell shorts or machinery malfunctions can be detected by a simple continuity test of the cell. Once the cell has been assembled and checked, a solution of the electrolyte salt in the plasticizer can be added. This operation can be carried out in the same way in which the electrolyte solvent and salt are added to a conventional assembled liquid electrolyte cell. This solution will soak into the plastic film/separator layer and any voids remaining in the positive electrode. The electrolyte/separator layer will swell and gain ionic conductivity. Swelling also provides good electrode/electrolyte interfacial contact. The final electrolyte/separator layer should have the same composition, ionic conductivity, and mechanical properties as the highly-plasticized gel electrolyte. In this way, both the safety and handling problems associated with the fully-plasticized polymer electrolyte can be avoided.

In order to eliminate inter-cell currents, the battery should be designed and manufactured so that no free excess liquid electrolyte is present. This can be accomplished by choosing polymer materials for the plastic film/separator which readily soak up the electrolyte and by limiting the quantity of electrolyte added to an amount which can be completely absorbed. Battery constructions which minimize the effect of unintentional excess electrolyte by maximizing the resistance of any ionic paths between cells formed by the addition of excess electrolyte are preferred. For example, the path along which ions must flow to get from one cell to another could be maximized by placing the cells in tight fitting, electrically insulating enclosures (such as a heat-shrunk tube), and the cross sectional area of any cavity which might be occupied by excess electrolyte could be minimized.

As noted above, the use of polymer electrolytes avoids cell-to-cell sealing problems since the electrolyte is solid and hence does not flow between neighboring cells in a battery. Without constructing individual sealed cells or otherwise isolating the individual cells, a polymer electrolyte battery free from inter-cell leakage currents may be constructed using a plurality of polymer electrolyte-based electrodes in a single wound jelly roll. This use of a polymer electrolyte in place of a liquid electrolyte can result in a simple construction which is easy to manufacture and has improved energy density. Further, the battery of the present invention avoids the need for providing separate sealed containers to separate the electrolyte as is required for multi-cell liquid electrolyte batteries. Thus, the additional constructional complexity and associated expense as well as the container volume used for such separate containers may be avoided by constructing such a battery in accordance with the present invention.

By forming a battery having a spiral-wound electrode assembly as a plurality of lower voltage cells coupled in series, less-expensive lower voltage components may be used to construct the cell. For example, a two-cell alkaline manganese dioxide polymer battery could replace a single cell lithium-manganese dioxide battery with liquid electrolyte and provide substantially the same battery voltage at a lower cost.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A battery comprising:
   a housing; and
   a spiral-wound electrode assembly disposed in said housing and defining at least two electrochemical cells that are electrically connected in series and are concentric with respect to each other, each of said cells includes wound layers of a positive electrode, a negative electrode, and a polymer electrolyte provided between said positive and negative electrode layers.

2. The battery as defined in claim 1, wherein said cells are electrically insulated from one another by an insulating layer wound between electrode layers of said cells that are otherwise adjacent to one another.

3. The battery as defined in claim 1, wherein said cells are electrically connected in series by an electrical connector strip between the positive electrode of one cell and the negative electrode of another cell.

4. The battery as defined in claim 1, wherein the battery is a rechargeable battery.

5. The battery as defined in claim 4, wherein said negative electrodes include a lithium intercalable carbonaceous active material, and said positive electrodes include a lithiated metal oxide active material.

6. The battery as defined in claim 1, wherein the battery is a primary battery.

7. The battery as defined in claim 6, wherein said negative electrodes include a lithium metal or lithium alloy and said positive electrodes include a metal oxide or metal sulfide.

8. The battery as defined in claim 1, wherein at least one of said positive electrodes and said negative electrodes includes an elongated conductive strip coated on both sides with an active material.

9. The battery as defined in claim 1, wherein said positive electrodes and said negative electrodes each include an elongated conductive strip coated on both sides with an active material.

10. The battery as defined in claim 1, wherein said housing is cylindrical and said spiral-wound electrode assembly is cylindrical.

11. The battery as defined in claim 1, wherein said housing is prismatic and said spiral-wound electrode assembly is non-cylindrical.

12. A battery comprising:
    a housing; and
    a spiral-wound electrode assembly disposed in said housing and including first and second electrochemical cells that are electrically connected in series, both of said cells include wound layers of a positive electrode, a negative electrode, and a polymer electrolyte provided between said positive and negative electrode layers, wherein the layers of said second cell are wound around the layers of said first cell.

13. The battery as defined in claim 12, wherein the battery is rechargeable.

14. The battery as defined in claim 12, wherein said housing is cylindrical and said spiral-wound electrode assembly is cylindrical.

15. The battery as defined in claim 12 and further including external positive and negative electrical contact terminals, said positive contact terminal being electrically connected to the positive electrode of said first cell and said negative contact terminal being electrically connected to the negative electrode of said second cell.

16. The battery as defined in claim 12, wherein said first and second cells are electrically insulated from one another by an insulating layer wound between an outermost electrode layer of said first cell and an innermost electrode layer of said second cell.

17. The battery as defined in claim 12, wherein said first and second cells are electrically connected in series by an electrical connector strip between the positive electrode of said second cell and the negative electrode of said first cell.

18. A method of assembling a multi-cell battery comprising the steps of:
    forming a first electrochemical cell by winding alternating layers of a positive electrode, a negative electrode, and a polymer electrolyte;
    electrically coupling one of the positive and negative electrodes of said first cell to an electrode of opposite polarity of a second electrochemical cell;
    forming the second electrochemical cell by winding alternating layers of a positive electrode, a negative electrode, and a polymer electrolyte around wound layers of said first cell; and
    placing the first and second wound cells in a battery housing.

19. The method as defined in claim 18 and further including the step of winding an insulating layer around the first wound cell prior to winding the second cell.

20. The method as defined in claim 18, wherein the step of electrically coupling electrodes of the first and second cells is performed prior to winding the first cell.

21. The method as defined in claim 18, wherein the step of forming the first cell includes sequentially winding a positive electrode layer, a first polymer electrolyte layer, a negative electrode layer, and a second polymer electrolyte layer.

22. The method as defined in claim 18, wherein the step of coupling an electrode of the first cell with an opposite electrode of the second cell includes providing a connector strip to make the electrical connection between the electrodes.

23. The battery as defined in claim 1, wherein all the layers of a first one of said at least two electrochemical cells are all wound around an outermost layer of a second one of said at least two electrochemical cells.

24. The battery as defined in claim 12, wherein all the layers of said second cell are wound around the outermost layer of said first cell.

* * * * *